(12) United States Patent
Chen et al.

(10) Patent No.: US 12,413,570 B2
(45) Date of Patent: Sep. 9, 2025

(54) DIGITAL CERTIFICATE OBTAINING METHOD AND APPARATUS

(71) Applicant: CHINA IWNCOMM CO., LTD., Shaanxi (CN)

(72) Inventors: Weigang Chen, Shaanxi (CN); Peng Li, Shaanxi (CN); Geng Chen, Shaanxi (CN); Xiang Yan, Shaanxi (CN); Guoqiang Zhang, Shaanxi (CN)

(73) Assignee: CHINA IWNCOMM CO., LTD., Shaanxi (CN)

( * ) Notice: Subject to any disclaimer, the term of this patent is extended or adjusted under 35 U.S.C. 154(b) by 248 days.

(21) Appl. No.: 18/011,591

(22) PCT Filed: May 20, 2021

(86) PCT No.: PCT/CN2021/094913
§ 371 (c)(1),
(2) Date: Dec. 20, 2022

(87) PCT Pub. No.: WO2022/007510
PCT Pub. Date: Jan. 13, 2022

(65) Prior Publication Data
US 2023/0164135 A1    May 25, 2023

(30) Foreign Application Priority Data

Jul. 6, 2020 (CN) .......................... 202010640522.3

(51) Int. Cl.
*H04L 9/40* (2022.01)
(52) U.S. Cl.
CPC ...... *H04L 63/0823* (2013.01); *H04L 63/0272* (2013.01)

(58) Field of Classification Search
CPC ............. H04L 63/0272; H04L 63/0823; H04L 63/0281; H04L 63/20; H04L 67/02
(Continued)

(56) References Cited

U.S. PATENT DOCUMENTS 6,081,900 A * 6/2000 Subramaniam ..... H04L 63/0807
713/153
6,360,254 B1 * 3/2002 Linden ................. G06F 16/955
707/E17.112

(Continued)

OTHER PUBLICATIONS

NPL Search Terms (Year: 2024).*
NPL Search Terms (Year: 2025).*
ISR dated Aug. 4, 2021 for PCT/CN2021/094913.

*Primary Examiner* — Syed A Zaidi
(74) *Attorney, Agent, or Firm* — ArentFox Schiff LLP; Michael Fainberg

(57) ABSTRACT

A digital certificate obtaining method and apparatus. The method includes: a routing device receives a network access request sent by a terminal on the basis of a first virtual local area network, wherein the first virtual local area network is associated with a uniform resource locator (URL) of a server, so that the terminal obtains, by means of the server, a digital certificate used for accessing a second virtual local area network; and in response to the network access request sent by the terminal on the basis of the first virtual local area network, the routing device sends the URL of the server to the terminal, so that the terminal obtains the digital certificate from the server according to the URL.

18 Claims, 5 Drawing Sheets

(58) Field of Classification Search
USPC .................................. 726/12, 10, 2; 713/156
See application file for complete search history.

(56) References Cited

U.S. PATENT DOCUMENTS

| | | | | |
|---|---|---|---|---|
| 6,640,302 | B1* | 10/2003 | Subramaniam | H04L 63/162 |
| | | | | 713/169 |
| 8,166,141 | B1* | 4/2012 | Van Horne, III | H04L 67/02 |
| | | | | 709/225 |
| 8,341,717 | B1 | 12/2012 | Delker et al. | |
| 9,871,722 | B2* | 1/2018 | Ou | H04L 61/4511 |
| 2003/0074555 | A1* | 4/2003 | Fahn | H04L 9/3263 |
| | | | | 713/156 |
| 2004/0117493 | A1* | 6/2004 | Bazot | H04L 63/0884 |
| | | | | 709/229 |
| 2006/0036850 | A1* | 2/2006 | Enokida | H04L 63/0869 |
| | | | | 713/156 |
| 2006/0271707 | A1* | 11/2006 | Cheline | H04L 63/0823 |
| | | | | 709/245 |
| 2010/0242105 | A1* | 9/2010 | Harris | H04L 63/105 |
| | | | | 709/229 |
| 2015/0334110 | A1* | 11/2015 | Bishop | H04L 63/0272 |
| | | | | 713/156 |
| 2017/0012780 | A1* | 1/2017 | Kaliski, Jr. | H04L 9/3247 |
| 2017/0012941 | A1* | 1/2017 | Subbarayan | H04L 67/10 |
| 2017/0244577 | A1* | 8/2017 | Patrick | H04L 12/2801 |
| 2017/0353496 | A1* | 12/2017 | Pai | H04L 63/10 |
| 2017/0366636 | A1* | 12/2017 | Wang | H04L 63/166 |
| 2018/0048624 | A1* | 2/2018 | Fok | H04L 63/0272 |
| 2021/0319868 | A1* | 10/2021 | Whitaker | G16H 10/60 |

* cited by examiner

DIGITAL CERTIFICATE OBTAINING METHOD AND APPARATUS

CROSS REFERENCE TO RELATED APPLICATIONS

The present disclosure is a National Stage of International Application No. PCT/CN2021/094913, filed on May 20, 2021, which claims priority to Chinese Patent Application No. 202010640522.3 filed on Jul. 6, 2020 and entitled "DIGITAL CERTIFICATE OBTAINING METHOD AND APPARATUS", the entire contents of which are incorporated herein by reference.

FIELD

The present disclosure relates to the technical field of communication, in particular to a digital certificate obtaining method and apparatus.

BACKGROUND

A digital certificate refers to a digital authentication that marks the identity information of parties communicating in an Internet communication to identify the identity of the other party. The digital certificate is also referred to as a digital identification. The digital certificate supports the integrity and security of information and data of network users in computer network communication.

Currently, network access based on wireless LAN authentication and privacy infrastructure (WAPI) and WiFi has employed the digital certificate to ensure the security of network access (commonly referred to as "surfing the internet"), which is referred to as a certificate model. The certificate mode is a mode with the highest level of security currently available for smart devices to opt when wireless network access is performed.

SUMMARY

In a first aspect, an embodiment of the present disclosure provides a digital certificate obtaining method, including: receiving, by a routing device, a network access request sent by a terminal based on a first virtual local area network, wherein the first virtual local area network is associated with a Uniform Resource Locator (URL) of a server such that the terminal obtains a digital certificate for accessing a second virtual local area network by the server; and sending, by the routing device, the URL of the server to the terminal in response to the network access request sent by the terminal based on the first virtual local area network such that the terminal obtains the digital certificate from the server according to the URL.

In an embodiment of the present disclosure, the method further includes: receiving, by the routing device, a network access request sent by the terminal based on the second virtual local area network; and performing, by the routing device, digital certificate authentication with the terminal according to the network access request sent by the terminal based on the second virtual local area network, and establishing a network connection with the terminal after the authentication passes.

In the embodiment of the present disclosure, sending, by the routing device, the URL of the server to the terminal in response to the network access request sent by the terminal based on the first virtual local area network, includes: sending a DNS resolution response to the terminal after a proxy Domain Name System (DNS) service in the routing device receives a DNS resolution request sent by the terminal based on the first virtual local area network, the DNS resolution response carrying an IP address of a proxy WEB service in the routing device; and receiving, by the proxy WEB service in the routing device, a network access request sent by the terminal according to the IP address of the proxy WEB service and based on the first virtual local area network, and sending redirection information carrying the URL of the server to the terminal, wherein the server enables the terminal to obtain a digital certificate for accessing the second virtual local area network.

In an embodiment of the present disclosure, sending, by the routing device, the URL of the server to the terminal in response to the network access request sent by the terminal based on the first virtual local area network, includes: sending the redirection information carrying the URL of the server to the terminal after the proxy DNS service in the routing device receives the DNS resolution request sent by the terminal based on the first virtual local area network, wherein the server enables the terminal to obtain a digital certificate for accessing the second virtual local area network.

In an embodiment of the present disclosure, the routing device is configured with a first service set identification and a second service set identification, wherein the first service set identification is configured to identify the first virtual local area network and the second service set identification is configured to identify the second virtual local area network.

In a second aspect, an embodiment of the present disclosure provides a routing device including: a receiving module, configured to receive a network access request sent by a terminal based on a first virtual local area network, wherein the first virtual local area network is associated with a URL of a server such that the terminal obtains a digital certificate for accessing a second virtual local area network by the server; and a processing module, configured to send the URL of the server to the terminal in response to the network access request initiated based on the first virtual local area network such that the terminal obtains the digital certificate from the server according to the URL.

In an embodiment of the present disclosure, the receiving module is further configured to receive a network access request sent by the terminal based on the second virtual local area network; and the processing module is further configured to perform digital certificate authentication with the terminal according to the network access request sent by the terminal based on the second virtual local area network, and establish a network connection with the terminal after the authentication passes.

In an embodiment of the present disclosure, the processing module includes a proxy DNS service module and a proxy WEB service module; the proxy DNS service module is configured to, after receiving a DNS resolution request sent by the terminal based on the first virtual local area network, send a DNS resolution response to the terminal, the DNS resolution response carrying an IP address of the proxy WEB service module; and the proxy WEB service module is configured to receive a network access request sent by the terminal according to the IP address of the proxy WEB service and based on the first virtual local area network, and send redirection information carrying the URL of the server to the terminal, wherein the server enables the terminal to obtain a digital certificate for accessing the second virtual local area network.

In an embodiment of the present disclosure, the processing module includes a proxy DNS service module; and the proxy DNS service module is configured to, after receiving a DNS resolution request sent by the terminal based on the first virtual local area network, send the redirection information carrying the URL of the server to the terminal, wherein the server enables the terminal to obtain a digital certificate for accessing the second virtual local area network.

In an embodiment of the present disclosure, the routing device is configured with a first service set identification and a second service set identification, wherein the first service set identification is configured to identify the first virtual local area network and the second service set identification is configured to identify the second virtual local area network.

In a third aspect, an embodiment of the present disclosure provides a routing device including a processor, a memory, and a communication interface; the communication interface receives and sends data under the control of the processor; the memory stores computer instructions; and the processor is configured to read the computer instructions to perform the method in the first aspect.

In a fourth aspect, the present disclosure provides a computer-readable storage medium storing computer-executable instructions, wherein the computer-executable instructions are configured to enable a computer to perform any method in the first aspect.

BRIEF DESCRIPTION OF THE DRAWINGS

In order to more clearly illustrate the embodiments of the present disclosure or the technical solutions in the related art, the drawings required for the embodiments or the description of the prior art are simply introduced, and it will be apparent that the drawings in the following description are some embodiments of the present disclosure and that those of ordinary skill in the art can obtain other drawings according to these drawings without inventive effort.

DETAILED DESCRIPTION OF THE EMBODIMENTS

Figure 1:
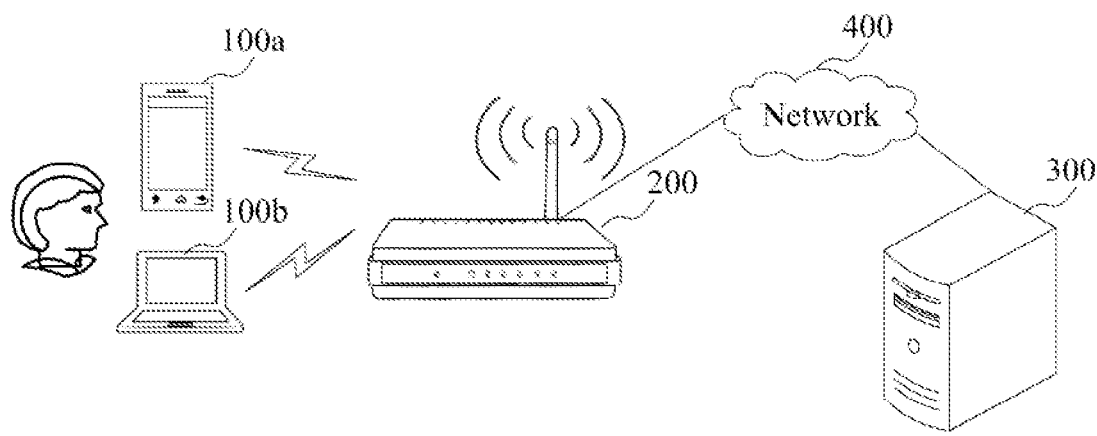
FIG. 1 exemplarily shows a schematic diagram of an application scenario provided by an embodiment of the present disclosure.

In order to make the objectives, technical solutions and advantages of the present disclosure will become more apparent, the present disclosure will be further described in detail below with reference to the drawings, and it will be apparent that the described embodiments are only some, but not all, embodiments of the present disclosure. Based on the embodiments in the present disclosure, all other embodiments obtained by those of ordinary skill in the art without making inventive effort fall within the scope of protection of the present disclosure.

Hereafter, the terms "first" and "second" are only used for differential description and cannot be understood as implying relative importance or implicitly indicating the number of the indicated technical feature. Thus, features defined as "first" and "second" may either explicitly or implicitly include one or more such features, and in the description of the embodiments of the present disclosure, "at least one" means one or more than one, unless otherwise stated.

When a digital certificate-based security mechanism is applied, a digital certificate needs to be installed for a terminal.

In the civilian field, the general digital certificate obtaining and installing processes are as follows: a user accesses the Internet by the terminal (e.g., by a wired local area network (LAN) or by dialing, or other manners) to log in a server, various pieces of information required to apply the digital certificate are input to a digital certificate application interface provided by the server, and a digital certificate file is downloaded and stored for manual installation. The above digital certificate application method requires the user to know a domain name or an IP address of the server in advance and to be familiar with the application flow of the digital certificate, which is cumbersome to operate.

In the field of industry/enterprise users, a digital certificate is generally configured by a network administrator via a certificate server for an industry/enterprise user or employee, and then is issued to the industry/enterprise user or employee for certificate installation via email, short messages, or the copy of a mobile memory (e.g., USB), resulting in tedious and error-prone process, and low efficiency.

To address the above problems, an embodiment of the present disclosure provides a digital certificate obtaining method. In the method, a first virtual local area network is arranged in a routing device in advance, and is associated with a URL pointing to a server for providing a digital certificate. When a user initiates a network access request by a first virtual local area network, the request is redirected to a server corresponding to the URL, so that the terminal can download and is equipped with a digital certificate for accessing a second virtual local area network by the server, thereby performing network access by the second virtual local area network. In the above process, a user does not need to memorize or obtain a domain name or an address of a server, so as to eliminate manual operation by a network administrator or the like, thereby simplifying and facilitating the obtaining and use operations of the digital certificate, and improving the user experience.

Embodiments of the present disclosure are described in detail below in conjunction with the drawings.

FIG. 1 exemplarily shows a schematic diagram of an application scenario provided by an embodiment of the present disclosure. As shown in FIG. 1, the scenario includes a terminal 100a and a terminal 100b, and the terminals (100a, 100b) are connected with a routing device 200 in a wireless or wired manner. The routing device 200 is connected with a server 300 by a network 400.

The terminals (100a, 100b) may be various forms of user devices, such as a mobile station (MS for short) and a terminal device. Some terminals are, for example, a mobile phone, a tablet computer, a laptop, a palmtop, a mobile internet device (MID), a wearable device, a wireless terminal in self-driving, a wireless terminal in a smart grid, a wireless terminal in a smart home, etc.

The routing device 200 is primarily configured to provide network access, and specifically may be an access router, an enterprise class router, a home router, or other network devices having a routing function.

The server 300 may be an enterprise class server, a public network server, or the like, and is configured to provide a digital certificate service for a user to obtain a digital certificate.

The network 400 may be the Internet, and correspondingly, the server 300 is a server of a digital certificate authority, which may provide a digital certificate application service for public users. The network 400 may also be a local area network, such as an enterprise local area network, and correspondingly, the server 300 may be an enterprise class server (for example, an IP address of the enterprise class server is http://192.168.1.1), which may provide a digital certificate application service for users within the enterprise local area network. The applied digital certificate is a digital certificate within the enterprise, and may correspond to an identity for identifying a network user within the enterprise.

In some embodiments, the server 300 may also be directly connected with or integrated in the routing device 200.

In an embodiment of the present disclosure, a first virtual local area network is set in the routing device 200 in advance, and is associated with a URL pointing to the server 300, which redirects the access request to the server 300 to guide the user to complete the digital certificate obtaining operation when the terminals (100a, 100b) perform network access based on the first virtual local area network.

Figure 2:
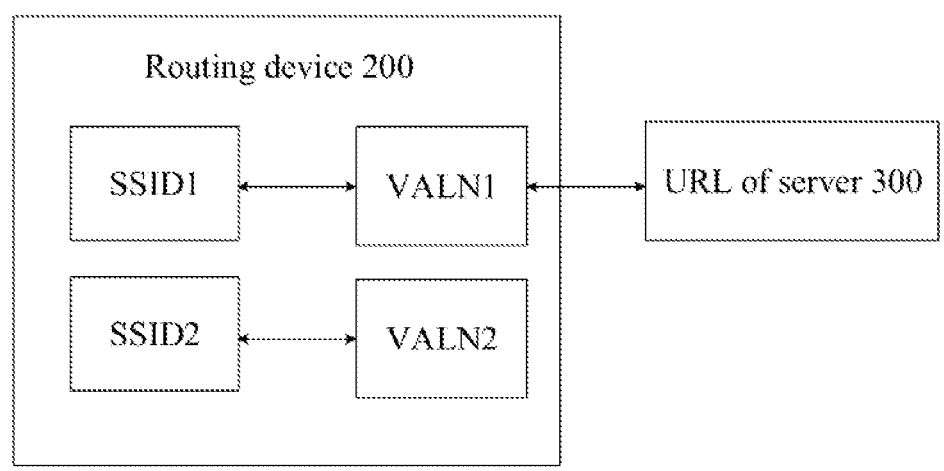
FIG. 2 exemplarily shows a schematic structural diagram of a routing device provided by an embodiment of the present disclosure.

FIG. 2 exemplarily shows a schematic diagram of configuration of a virtual local area network in a routing device 200 provided by an embodiment of the present disclosure. As shown in FIG. 2, VLAN1 (first virtual local area network), VLAN2 (second virtual local area network), service set identification SSID1, and service set identification SSID2 are configured on the routing device 200. SSID1 is configured to identify VLAN1, and the network of SSID1 is VLAN1. SSID2 is configured to identify VLAN2, and the network of SSID2 is VLAN2.

VLAN1 is configured as an access method without digital certificate authentication, for example, an access method of clicking on SSID and then entering passwords, or an access method of no entry of passwords after clicking on SSID, which is generally used when a smartphone accesses a wireless local area network; and VLAN2 is configured as an access method with digital certificate authentication.

VLAN1 is associated with a URL of the server 300 for providing the digital certificate to redirect network access initiated based on VLAN1 to the server 300, so that the terminal can download the digital certificate by the server 300. The digital certificate is a certificate that enables the terminals (100a, 100b) to access VLAN2.

After the digital certificate is installed, the terminals (100a, 100b) may access VLAN2 by the digital certificate to perform normal network access.

Figure 3:
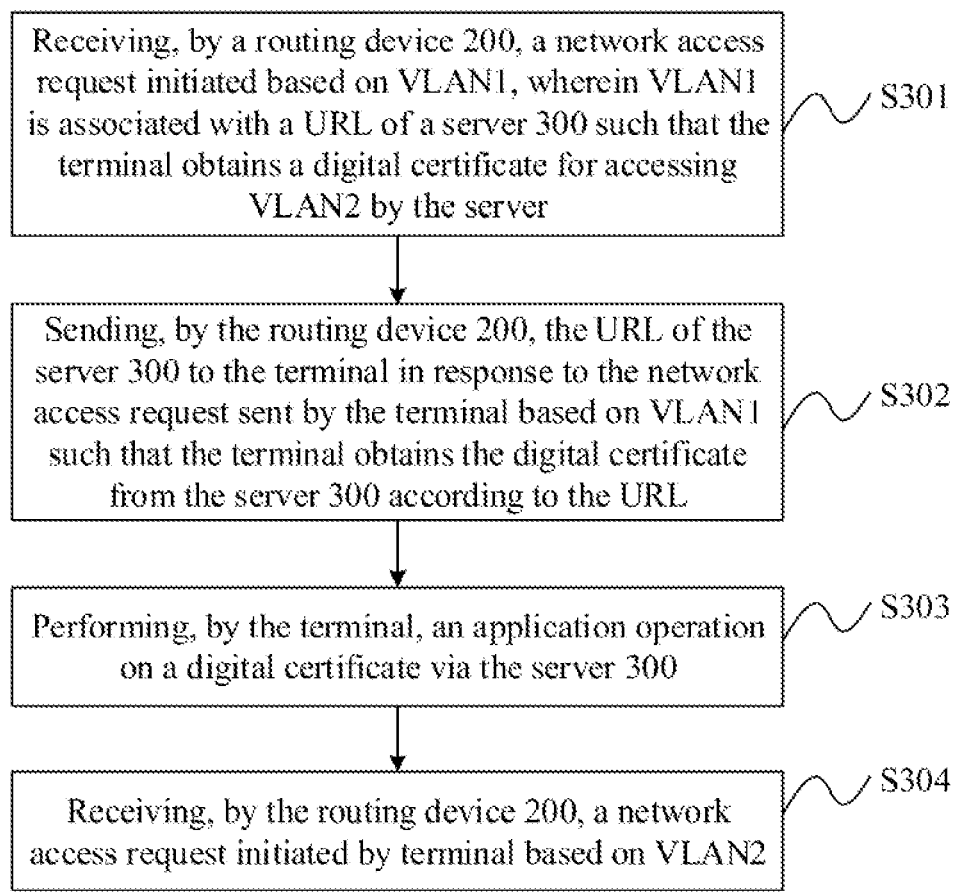
FIG. 3 exemplarily shows a flow chart of a network access method provided by an embodiment of the present disclosure.

FIG. 3 exemplarily shows a flow chart of a network access method provided by an embodiment of the present disclosure according to a schematic structural diagram of the routing device 200 as shown in FIG. 2. As shown in FIG. 3, the process mainly includes the following steps.

S301: The routing device 200 receives a network access request initiated by a terminal based on VLAN1.

VLAN1 is associated with the URL of the server such that the terminal obtains a digital certificate for accessing VLAN2 by the server.

In this step, at the terminal side, the terminal obtains an SSID list of the routing device, in which SSID1 and SSID2 are included, wherein SSID1 is an identity of VLAN1 and SSID2 is an identity of VLAN2. SSID1 in the SSID list is triggered to select corresponding VLAN1 (e.g., the user clicks on SSID1 in the SSID list by a touch screen of the terminal, or a SSID1 is automatically selected by an application (APP) on the terminal) such that the terminal accesses to VLAN1 corresponding to SSID1.

In some application scenarios, a browser on a terminal is opened actively (e.g., a terminal program is automatically opened) or opened passively (e.g., a user opens the browser), and the browser actively or passively sends a network access request to the routing device 200. Currently, most smartphones automatically submit network access requests to routing devices by means of browsers, that is, the so-called active submission of network access requests. Other terminal devices may still need to manually enter a string (e.g., xxx.com, yyy.org, etc.) that conforms to a domain name format in the browser to trigger the terminal to send a network access request by the browser to the routing device 200, that is, the so-called passive submission of network access requests.

S302: the routing device 200 sends the URL of the server 300 to the terminal in response to the network access request sent by the terminal based on VLAN1, such that the terminal obtains a digital certificate from the server 300 according to the URL.

In this step, the routing device 200 may confirm that the network access request is sent based on VLAN1 according to identification of SSID1. In response to the network access request, the routing device 200 feeds back a URL of the server 300 associated with VLAN1 to the terminal, such that the terminal accesses the server 300 corresponding to the URL by the browser.

In the embodiment, for the network access request for any domain name (a string conforming to the domain name format) sent by the terminal, the routing device may feed back the URL of the server 300 associated with VLAN1 to the terminal for response, such that the terminal accesses the server 300 corresponding to the URL.

S303: the terminal performs an application operation for the digital certificate by the server 300.

In this step, at the terminal side, the user may click on a "download" function option based on a prompt from a digital certificate application interface provided by the server 300, and select a local storage path for the digital certificate based on the prompt. After downloading is completed, the user clicks on an "install" function option and selects a local installation path for the digital certificate to install the digital certificate at the terminal.

In other embodiments, for example, a digital certificate download page may provide a method for downloading and installing the digital certificate, for example, may provide an instruction document containing a download address and an installation process of the digital certificate, and at the terminal side, the user downloads and installs the digital certificate according to the instruction document.

The terminal may, after obtaining the digital certificate, initiate a network access process based on VLAN2 using the digital certificate when network access is required, which specifically includes the following steps.

S304: the routing device 200 receives a network access request initiated by the terminal based on VLAN2.

In this step, SSID2 in the SSID list of the terminal is triggered (e.g., the user clicks on SSID2, or an APP on the terminal automatically selects SSID2), such that the terminal accesses VLAN2. The terminal is able to access VLAN2 because the digital certificate installed at the terminal is the certificate to access VLAN2.

The routing device 200 performs digital certificate authentication with the terminal and establishes a network connection with the terminal after the authentication passes, thereby achieving general network access.

The digital certificate generally has a validity period during which the terminal may not repeat the downloading and installing process of the S301-S303, and directly performs the network access process of the S304. When the user performs network access by the terminal within a preset number of days before expiration of the validity period of the digital certificate, an APP user interface on the terminal may provide prompt information to update the digital certificate, such that the user updates the digital certificate according to the prompt information. If the digital certificate is not updated before expiration, the terminal cannot perform network access, and performs the digital certificate obtaining process of the S301-S303 again.

The above steps S301 to S303 are the digital certificate obtaining process, the routing device 200 redirects the access request sent by the terminal to the server 300 based on VLAN1, such that the user can download and install the digital certificate without needing to memorize the IP address of the server, thereby simplifying the operation of obtaining the digital certificate by the user.

In some embodiments, the routing device 200 and the server 300 may be integrated in an apparatus having the same function as the routing device 200 and the server 300 deployed independently.

In some embodiments, the routing device may include a proxy DNS service and a proxy WEB service, and the network access request of the terminal may be redirected to the server by the proxy DNS service and the proxy WEB service. The process may be as shown in FIG. 4.

Figure 4:
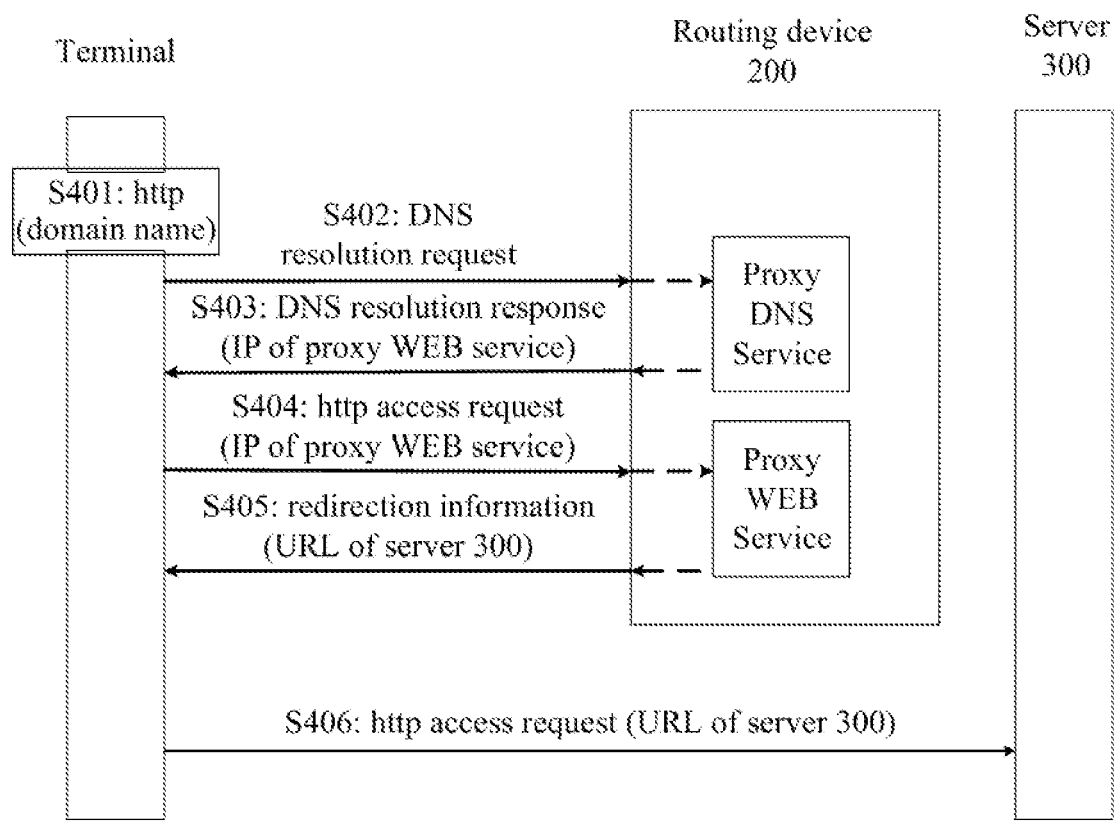
FIG. 4 exemplarily shows a flow chart of obtaining a digital certificate provided by an embodiment of the present disclosure.

FIG. 4 exemplarily shows a flow chart of redirection of a network access request provided by an embodiment of the present disclosure. As shown in FIG. 4, the process includes the following several steps:

S401: the terminal selects SSID1 to access VLAN1 according to the SSID list provided by the routing device 200, and receives a domain name address entered by the user or automatically generated by a terminal program;

S402: the terminal sends a DNS resolution request based on VLAN1 to the routing device 200, wherein the request is submitted to the proxy DNS service for processing;

S403: the proxy DNS service in the routing device 200 may, after receiving the DNS resolution request, send a DNS resolution response to the terminal, the DNS resolution response carrying an IP address of the proxy WEB service;

S404: the terminal sends a hypertext transfer protocol (HTTP) access request to the routing device 200 according to the IP address of the proxy WEB service, wherein the HTTP access request is submitted to the proxy WEB service for processing;

S405: the proxy WEB service in the routing device 200, in response to the HTTP access request, sends redirection information carrying the URL of the server 300 to the terminal, wherein the server 300 is configured to cause the terminal to obtain a digital certificate for accessing VLAN2; and S406: the terminal sends the HTTP access request to the corresponding server 300 according to the URL, to complete the digital certificate obtaining operation by accessing the server 300.

In some embodiments, when the server 300 is a server that provides a digital certificate of a public network, the server 300 may be accessed by translating a source IP address of the terminal to an IP address of the public network by source network address translation (SNAT); and when server 300 is a server that provides an internal network digital certificate, no SNAT is required.

In the above embodiments of the present disclosure, in the S402, the DNS resolution request sent by the terminal may include a domain name entered by the user and some other parameters; in the S403, these parameters may be included in the DNS resolution response returned to the terminal by the proxy DNS access; in the S404, the proxy WEB service can normalize the domain name address entered by the user and remove unnecessary parameters, so that the server can ensure a correct response to the received request (in most cases, servers in the market can handle unnecessary parameters in the domain name to make a correct response to received access requests; however, in a few cases, there are servers that cannot handle unnecessary parameters in the domain name, resulting in the received access request being considered as an erroneous request, thereby feeding back the error to the terminal, e.g., 404 error, etc.).

In further embodiments of the present disclosure, the routing device may include the proxy DNS service by which the network access request of the terminal is redirected to the server 300. The process may be as shown in FIG. 5.

Figure 5:
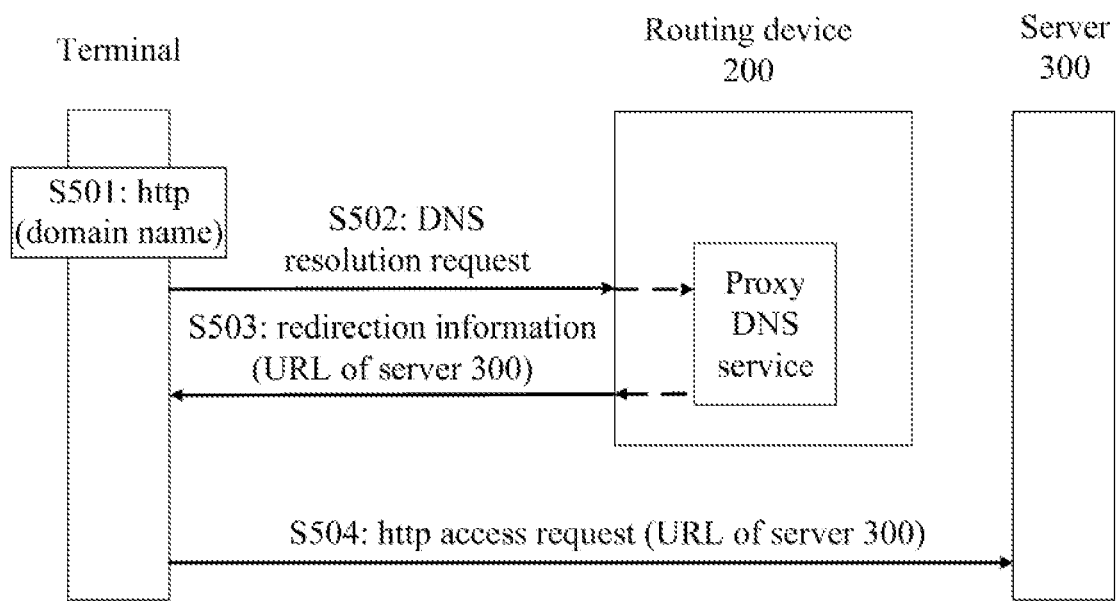
FIG. 5 exemplarily shows a flow chart of obtaining a digital certificate provided by an embodiment of the present disclosure.

FIG. 5 exemplarily shows a flow chart of obtaining a digital certificate provided by an embodiment of the present disclosure. As shown in FIG. 5, the process includes the following steps:

S501: the terminal selects SSID1 to access VLAN1 according to the SSID list provided by the routing device 200, and receives a domain name address entered by the user or automatically generated by a terminal program;

S502: the terminal sends a DNS resolution request based on VLAN1 to the routing device 200, wherein the request is submitted to the proxy DNS service for processing;

S503: the proxy DNS service in the routing device 200 may, after receiving the DNS resolution request, send redirection information of a URL carrying the server 300 to the terminal, wherein the server 300 is configured to cause the terminal to obtain a digital certificate for accessing VLAN2; and S504: the terminal sends a HTTP access request to the corresponding server 300 according to the URL, thereby completing the digital certificate obtaining operation by the server 300.

In embodiments of the present disclosure, the routing device is internally configured with VLAN1 and VLAN2, wherein VLAN1 is associated with the URL of the server configured to provide the digital certificate that enables the terminal to access VLAN2. When the terminal accesses VLAN1, the browser of the terminal submits the network access request to the routing device 200 which redirects the network access request to the server associated with VLAN1, such that the terminal obtains the digital certificate from the server. When the user needs network access, the network access request may be initiated based on VLAN2 for normal network access. The user does not need to memorize or obtain the domain name or address of the server, so that the difficulty of obtaining the digital certificate is reduced, the digital certificate obtaining operation is simplified, and the user experience is improved.

Based on the same technical concept, an embodiment of the present disclosure also provides a routing device that can realize the functions of the routing device in the foregoing embodiments.

Figure 6:
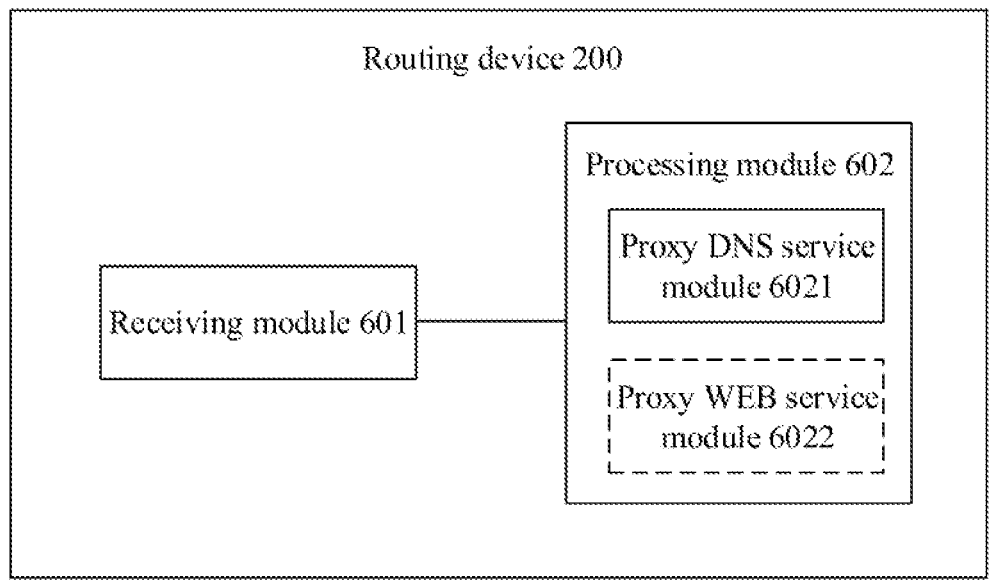
FIG. 6 exemplarily shows a schematic structural diagram of a routing device provided by an embodiment of the present disclosure.

FIG. 6 exemplarily shows a structure of a routing device in an embodiment of the present disclosure. As shown FIG. 6, the routing device may include a receiving module 601, and a processing module 602.

The receiving module 601 is configured to receive a network access request sent by a terminal based on a first virtual local area network, wherein the first virtual local area network is associated with a URL of a server such that the terminal obtains a digital certificate for accessing a second virtual local area network by the server.

The processing module 602 is configured to send the URL of the server to the terminal in response to the network access request initiated by the terminal based on the first virtual local area network such that the terminal obtains the digital certificate from the server according to the URL.

In some embodiments of the present disclosure, the receiving module 601 is further configured to receive a network access request initiated by the terminal based on the second virtual local area network; and the processing module 602 is further configured to perform digital certificate authentication with the terminal according to the network access request sent by the terminal based on the second virtual local area network, and establish a network connection with the terminal after the authentication passes.

In some embodiments of the present disclosure, the processing module includes a proxy DNS service module 6021 and a proxy WEB service module 6022.

The proxy DNS service module 6021 is configured to, after receiving a DNS resolution request sent by the terminal based on the first virtual local area network, send a DNS resolution response to the terminal, the DNS resolution response carrying an IP address of the proxy WEB service module; and the proxy WEB service module 6022 is configured to receive a network access request sent by the terminal according to the IP address of the proxy WEB service and based on the first virtual local area network, and send redirection information carrying the URL of the server to the terminal, wherein the server enables the terminal to obtain a digital certificate for accessing the second virtual local area network.

In some embodiments of the present disclosure, the processing module includes a proxy DNS service module 6021; and the proxy DNS service module 6021 is further configured to, after receiving the DNS resolution request sent by the terminal based on the first virtual local area network, send redirection information carrying a URL of the server to the terminal, wherein the server enables the terminal to obtain a digital certificate for accessing the second virtual local area network.

In some embodiments of the present disclosure, the routing device is configured with a first service set identification and a second service set identification, wherein the first service set identification is configured to identify the first virtual local area network and the second service set identification is configured to identify the second virtual local area network.

It should be noted that the above routing device provided by embodiments of the present disclosure can implement all the method steps implemented by the embodiments of the above method and achieve the same technical effects. Parts and advantages of the embodiment, which are same as those of the method embodiments are not described in detail here.

Based on the same technical concept, an embodiment of the present disclosure also provides a routing device that can realize the functions of the routing device in the foregoing embodiments.

Figure 7:
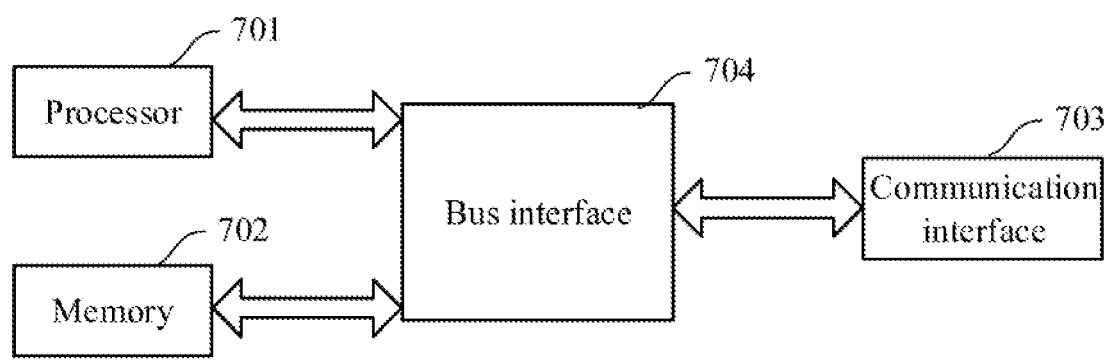
FIG. 7 exemplarily shows a schematic structural diagram of a routing device provided by an embodiment of the present disclosure.

FIG. 7 exemplarily shows a schematic structural diagram of a routing device in an embodiment of the present disclosure. As shown in FIG. 7, the routing device may include a processor 701, a memory 702, a communication interface 703, and a bus interface 704.

The processor 701 is responsible for managing a bus architecture and processing generally, and the memory 702 can store data used by the processor 701 in performing operations. The communication interface 703 is configured to receive and send data under the control of the processor 701.

The bus architecture may include any quantity of interconnecting buses and bridges, specifically, various circuits of one or more processors, represented by the processor 701, and a memory represented by the memory 702 are linked together. The bus architecture may also link various other circuits such as peripherals, voltage regulators and power management circuits, which are well known in the art, and therefore, will not be further described herein. The bus interface provides an interface. The processor 701 is responsible for managing the bus architecture and processing generally, and the memory 702 can store data used by the processor 701 in performing operations.

The processes disclosed in embodiments of the present disclosure may be applied to or implemented by the processor 701. In the implementation process, the various steps of the signal processing flow may be completed by integrated logic circuitry of hardware or instructions in the form software in the processor 701. The processor 701 may be a general purpose processor, a digital signal processor, an application specific integrated circuit, a field programmable gate array or other programmable logic device, a discrete gate or a transistor logic device, a discrete hardware component, which may implement or perform the methods, steps, and logical block diagrams disclosed in the embodiments of the present disclosure. The general purpose processor may be a microprocessor or any conventional processor or the like. The steps of the method disclosed in connection with the embodiments of the present disclosure may be embodied directly as a hardware processor, or performed by a combination of hardware and software modules in the processor. The software module may be located in a storage medium in the art, such as a random access memory, a flash memory, a read-only memory, a programmable read-only memory, or an electrically erasable programmable memory and a register. The storage medium is located in the memory 702, and the processor 701 reads information from the memory 702, and in conjunction with its hardware, completes the steps of the signal processing flow. In some embodiments, the processor 701 is configured to read computer instructions in the memory 702 and execute the functions implemented at the terminal side in the flows as shown in FIG. 3.

In some embodiments, the processor 701 may read computer instructions in the memory 702 to perform the following operations:

receiving, by a routing device, a network access request sent by the terminal based on the first virtual local area network, wherein the first virtual local area network is associated with a URL of a server such that the terminal can obtain a digital certificate for accessing a second virtual local area network by the server; and sending, by the routing device, the URL of the server to the terminal in response to the network access request sent by the terminal based on the first virtual local area network such that the terminal obtains the digital certificate from the server according to the URL.

In an embodiment of the present disclosure, the operations performed by the processor further include:

receiving a network access request sent by the terminal based on the second virtual local area network;

performing, according to the network access request initiated by the terminal based on the second virtual local area network, digital certificate authentication by the routing device with the terminal, and establishing a network connection with the terminal after the authentication passes.

It should be noted that the above routing device provided by embodiments of the present disclosure can implement all the method steps implemented by embodiments of the above method and achieve the same technical effects. Parts and advantages of the embodiment, which are same as those of the method embodiments are not described in detail here.

An embodiment of the present disclosure also provides a non-transitory computer-readable storage medium storing computer-executable instructions, wherein the computer-executable instructions are configured to enable a computer to perform the method performed by the routing device in the above embodiments.

Those skilled in the art should understand that the embodiments of the present disclosure may be provided as a method, system, or computer program product. Accordingly, the present disclosure may take the form of an entirely hardware embodiment, an entirely software embodiment or an embodiment combining software and hardware aspects. Furthermore, the present disclosure may take the form of a computer program product implemented on one or more computer available storage media (including but not limited to disc storage, CD-ROM, optical memory, etc.) including computer available program codes.

The present disclosure is described with reference to flow charts and/or block diagrams of the method, device (system) and computer program products according to the present disclosure. It should be understood that each flow and/or block in the flow chart and/or block diagrams, and combinations of the flows and/or blocks in the flow chart and/or block diagrams, can be implemented by computer program instructions. These computer program instructions may be provided to a general purpose computer, a special purpose computer, an embedded processing machine, or a processor of other programmable data processing device to produce a machine, such that the instructions executed by the processor of the computer or other programmable data processing device produce an apparatus for implementing the functions specified in one or more flows of the flow charts and/or one or more blocks of the block diagrams.

These computer program instructions may also be stored in a computer-readable memory that can guide the computer or other programmable data processing device to function in a particular manner, such that the instructions stored in the computer-readable memory produce an article of manufacture including an instruction apparatus which implements the functions specified in one or more flows of the flow chart and/or one or more blocks of the block diagrams.

These computer program instructions may also be loaded onto a computer or other programmable data processing device, a series of operation steps are caused performed on the computer or other programmable device to produce a computer-implemented process such that the instructions which are executed on the computer or other programmable device provide steps for implementing the functions specified in one or more flows of the flow chart and/or one or more blocks of the block diagrams.

What is claimed is:

1. A digital certificate obtaining method, comprising:

receiving, by a routing device, a network access request sent by a terminal based on a first virtual local area network, wherein the first virtual local area network is associated with a Uniform Resource Locator (URL) of a server such that the terminal obtains a digital certificate for accessing a second virtual local area network by the server;

sending, by the routing device, the URL of the server to the terminal in response to the network access request sent by the terminal based on the first virtual local area network such that the terminal obtains the digital certificate from the server according to the URL.

2. The method according to claim 1, further comprising:

receiving, by the routing device, a network access request sent by the terminal based on the second virtual local area network;

performing, by the routing device, a digital certificate authentication with the terminal according to the network access request sent by the terminal based on the second virtual local area network, and establishing a network connection with the terminal after the authentication passes.

3. The method according to claim 2, wherein the routing device is configured with a first service set identification and a second service set identification, the first service set identification being configured to identify the first virtual local area network and the second service set identification being configured to identify the second virtual local area network.

4. The method according to claim 1, wherein the sending, by the routing device, the URL of the server to the terminal in response to the network access request sent by the terminal based on the first virtual local area network, comprises:

sending a DNS resolution response to the terminal after a proxy domain name system (DNS) service in the routing device receives a DNS resolution request sent by the terminal based on the first virtual local area network, the DNS resolution response carrying an IP address of a proxy WEB service in the routing device; and receiving, by the proxy WEB service, a network access request sent by the terminal according to the IP address of the proxy WEB service and based on the first virtual local area network, and sending redirection information carrying the URL of the server to the terminal, wherein the server enables the terminal to obtain a digital certificate for accessing the second virtual local area network.

5. The method according to claim 4, wherein the routing device is configured with a first service set identification and a second service set identification, the first service set identification being configured to identify the first virtual local area network and the second service set identification being configured to identify the second virtual local area network.

6. The method according to claim 1, wherein the sending, by the routing device, the URL of the server to the terminal in response to the network access request sent by the terminal based on the first virtual local area network, comprises:
sending the redirection information carrying the URL of the server to the terminal after the proxy DNS service in the routing device receives the DNS resolution request sent by the terminal based on the first virtual local area network, wherein the server enables the terminal to obtain a digital certificate for accessing the second virtual local area network.

7. The method according to claim 6, wherein the routing device is configured with a first service set identification and a second service set identification, the first service set identification being configured to identify the first virtual local area network and the second service set identification being configured to identify the second virtual local area network.

8. The method according to claim 1, wherein the routing device is configured with a first service set identification and a second service set identification, the first service set identification being configured to identify the first virtual local area network and the second service set identification being configured to identify the second virtual local area network.

9. A routing device, comprising a processor, a memory, and a communication interface; wherein
the communication interface receives and sends data under control of the processor;
the memory stores computer instructions; and
the processor is configured to read the computer instructions to perform followings:
receiving a network access request sent by a terminal based on a first virtual local area network, wherein the first virtual local area network is associated with a Uniform Resource Locator (URL) of a server such that the terminal obtains a digital certificate for accessing a second virtual local area network by the server;
sending the URL of the server to the terminal in response to the network access request sent by the terminal based on the first virtual local area network such that the terminal obtains the digital certificate from the server according to the URL.

10. The routing device according to claim 9, wherein the processor is further configured to read the computer instructions to perform followings:
receiving a network access request sent by the terminal based on the second virtual local area network;
performing a digital certificate authentication with the terminal according to the network access request sent by the terminal based on the second virtual local area network, and establishing a network connection with the terminal after the authentication passes.

11. The routing device according to claim 9, wherein the processor is configured to read the computer instructions to send the URL of the server to the terminal in response to the network access request sent by the terminal based on the first virtual local area network, by:
sending a DNS resolution response to the terminal after a proxy domain name system (DNS) service in the routing device receives a DNS resolution request sent by the terminal based on the first virtual local area network, the DNS resolution response carrying an IP address of a proxy WEB service in the routing device; and
receiving, by the proxy WEB service, a network access request sent by the terminal according to the IP address of the proxy WEB service and based on the first virtual local area network, and sending redirection information carrying the URL of the server to the terminal, wherein the server enables the terminal to obtain a digital certificate for accessing the second virtual local area network.

12. The routing device according to claim 9, wherein the processor is configured to read the computer instructions to send the URL of the server to the terminal in response to the network access request sent by the terminal based on the first virtual local area network, by:
sending the redirection information carrying the URL of the server to the terminal after the proxy DNS service in the routing device receives the DNS resolution request sent by the terminal based on the first virtual local area network, wherein the server enables the terminal to obtain a digital certificate for accessing the second virtual local area network.

13. The routing device according to claim 9, wherein the routing device is configured with a first service set identification and a second service set identification, the first service set identification being configured to identify the first virtual local area network and the second service set identification being configured to identify the second virtual local area network.

14. A non-transitory computer-readable storage medium storing computer-executable instructions, wherein the computer-executable instructions are configured to enable a computer to perform a digital certificate obtaining method, wherein the digital certificate obtaining method comprises:
receiving, by a routing device, a network access request sent by a terminal based on a first virtual local area network, wherein the first virtual local area network is associated with a Uniform Resource Locator (URL) of a server such that the terminal obtains a digital certificate for accessing a second virtual local area network by the server;
sending, by the routing device, the URL of the server to the terminal in response to the network access request sent by the terminal based on the first virtual local area network such that the terminal obtains the digital certificate from the server according to the URL.

15. The non-transitory computer-readable storage medium storing computer-executable instructions according to claim 14, wherein the computer-executable instructions are configured to enable a computer to perform followings:
receiving, by the routing device, a network access request sent by the terminal based on the second virtual local area network;
performing, by the routing device, a digital certificate authentication with the terminal according to the network access request sent by the terminal based on the second virtual local area network, and establishing a network connection with the terminal after the authentication passes.

16. The non-transitory computer-readable storage medium storing computer-executable instructions according to claim 14,
wherein the sending, by the routing device, the URL of the server to the terminal in response to the network access request sent by the terminal based on the first virtual local area network, comprises:

sending a DNS resolution response to the terminal after a proxy domain name system (DNS) service in the routing device receives a DNS resolution request sent by the terminal based on the first virtual local area network, the DNS resolution response carrying an IP address of a proxy WEB service in the routing device; and receiving, by the proxy WEB service, a network access request sent by the terminal according to the IP address of the proxy WEB service and based on the first virtual local area network, and sending redirection information carrying the URL of the server to the terminal, wherein the server enables the terminal to obtain a digital certificate for accessing the second virtual local area network.

17. The non-transitory computer-readable storage medium storing computer-executable instructions according to 14, wherein the sending, by the routing device, the URL of the server to the terminal in response to the network access request sent by the terminal based on the first virtual local area network, comprises:

sending the redirection information carrying the URL of the server to the terminal after the proxy DNS service in the routing device receives the DNS resolution request sent by the terminal based on the first virtual local area network, wherein the server enables the terminal to obtain a digital certificate for accessing the second virtual local area network.

18. The non-transitory computer-readable storage medium storing computer-executable instructions according to claim 14, wherein the routing device is configured with a first service set identification and a second service set identification, the first service set identification being configured to identify the first virtual local area network and the second service set identification being configured to identify the second virtual local area network.

* * * * *